(12) United States Patent
Zeng et al.

(10) Patent No.: US 10,962,829 B1
(45) Date of Patent: Mar. 30, 2021

(54) LIGHT BAR, BACKLIGHT MODULE AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Fanjian Zeng, Beijing (CN); Hebing Ma, Beijing (CN); Xianyong Gao, Beijing (CN); Sijun Lei, Beijing (CN); Haijun Liao, Beijing (CN); Yunsong Li, Beijing (CN); Bo Ran, Beijing (CN); Huan Wu, Beijing (CN); Qiang Chen, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/835,815

(22) Filed: Mar. 31, 2020

(51) Int. Cl.
| | |
|---|---|
| *G02F 1/13357* | (2006.01) |
| *F21S 4/28* | (2016.01) |
| *F21Y 115/10* | (2016.01) |
| *F21Y 105/10* | (2016.01) |
| *G02F 1/1335* | (2006.01) |

(52) U.S. Cl.
CPC .......... *G02F 1/133603* (2013.01); *F21S 4/28* (2016.01); *F21Y 2105/10* (2016.08); *F21Y 2115/10* (2016.08); *G02F 1/133612* (2021.01); *G02F 1/133613* (2021.01)

(58) Field of Classification Search
CPC ............................. G02F 1/133603; F21S 4/28
USPC ........................................................ 362/97.1
See application file for complete search history.

(56) References Cited

U.S. PATENT DOCUMENTS

| | | | | |
|---|---|---|---|---|
| 5,936,599 A | * | 8/1999 | Reymond | G09G 3/32 345/82 |
| 6,567,010 B1 | * | 5/2003 | Lin | G08G 1/095 340/815.45 |
| 7,293,896 B2 | * | 11/2007 | Cheung | F21S 4/10 362/612 |
| 8,109,650 B2 | * | 2/2012 | Chang | G02F 1/133603 313/498 |
| 8,226,257 B2 | * | 7/2012 | Ye | G02F 1/1336 362/97.1 |
| 2008/0205079 A1 | * | 8/2008 | Egawa | G02B 6/0068 362/612 |
| 2009/0189533 A1 | * | 7/2009 | Hsu | F21S 4/10 315/185 S |
| 2011/0149601 A1 | * | 6/2011 | Jang | H01L 25/0753 362/612 |
| 2011/0280003 A1 | * | 11/2011 | Hsu | H05K 1/189 362/97.1 |
| 2012/0300491 A1 | * | 11/2012 | Hussell | H01L 24/49 362/602 |
| 2013/0278139 A1 | * | 10/2013 | Sievers | H05B 45/00 315/77 |

(Continued)

*Primary Examiner* — Bryon T Gyllstrom
(74) *Attorney, Agent, or Firm* — Nath, Goldberg & Meyer; Joshua B. Goldberg

(57) ABSTRACT

The disclosure provides a light bar, a backlight module and a display device. The light bar includes a plurality of lamp beads, wherein each of the lamp beads is a dual-crystal lamp with two light-emitting crystals.

9 Claims, 2 Drawing Sheets

(56) References Cited

U.S. PATENT DOCUMENTS

| | | | |
|---|---|---|---|
| 2016/0062023 A1* | 3/2016 | Itoh | G02B 6/0026 362/608 |
| 2020/0159074 A1* | 5/2020 | Yang | G02F 1/133621 |

* cited by examiner

LIGHT BAR, BACKLIGHT MODULE AND DISPLAY DEVICE

CROSS-REFERENCE TO RELATED APPLICATIONS

The present disclosure claims the priority of Chinese Patent Application No. 201922025047.4, filed on Nov. 21, 2019, the content of which is incorporated herein by reference in its entirety.

TECHNICAL FIELD

The present disclosure relates to the field of display technology, in particular, to a light bar, a backlight module and a display device.

BACKGROUND

An ultra-narrow boarder or boarderless design of the display device has become a major development trend for high-quality display devices due to their advantages such as simplicity, beauty, large visible area per a same size, and the like.

SUMMARY

As an aspect, a light bar is provided. The light bar includes a plurality of lamp beads, wherein each of the lamp beads is a dual-crystal lamp with two light-emitting crystals.

In an embodiment, the dual-crystal lamp further includes a housing, the housing has a receiving space for receiving the light-emitting crystals, a first light outlet, and a second light outlet, a light beam emitted from a first light-emitting crystal of the two light-emitting crystals is output through the first light outlet, and a light beam emitted from a second light-emitting crystal of the two light-emitting crystals is output through the second light outlet.

In an embodiment, a plurality of dual-crystal lamps form a plurality of lamp strings, each of the lamp strings includes at least two dual-crystal lamps electrically connected in series, the dual-crystal lamps in each of the lamp strings are arranged along a first direction, and two light-emitting crystals in each of the dual-crystal lamps are sequentially arranged along the first direction.

In an embodiment, the plurality of dual-crystal lamps are arranged in sequence along the first direction, and any two adjacent dual-crystal lamps along the first direction belong to different lamp strings.

In an embodiment, each of the lamp strings has the same number of dual-crystal lamps.

In an embodiment, the dual-crystal lamp has two dual-crystal light-emitting diode, PN junctions of the two dual-crystal light-emitting diodes are connected in parallel, and the two dual-crystal light-emitting diode are packaged together.

In an embodiment, the light bar further includes a positive terminal and a negative terminal, wherein the plurality of lamp strings are connected in parallel between the positive terminal and the negative terminal.

As another aspect, a backlight module is provided. The backlight module includes a plurality of light bars connected in parallel.

In an embodiment, each of the light bars includes the same number of lamp strings.

In an embodiment, the backlight module further includes a power supply chip having a plurality of power supply channels electrically connected to the plurality of light bars in a one-to-one correspondence.

As another aspect, a display device is provided. The display device includes the above backlight module.

DETAILED DESCRIPTION

To enable one of ordinary skill in the art to better understand the technical solutions of the present disclosure, the present disclosure will be further described in detail below with reference to specific embodiments and the accompanying drawings.

A display device (e.g., a liquid crystal display device) includes a backlight module and a display panel mounted on the backlight module. The backlight module includes a light bar having a plurality of single-crystal lamps. In order to realize the ultra-narrow boarder and boarderless design of the display device, the light bar needs to be as close to a display region of the display panel as possible.

Due to the size limitation of a single-crystal lamp, a distance between two adjacent single-crystal lamps is large, so that a large dark region is between light beams from the two adjacent single-crystal lamps. The smaller a distance between the light bar and the display region is, the closer the display region is to the dark region of the light bar emitting light. When the distance between the light bar and the display region is small to a certain degree, uneven brightness of the light-emitting region of the display device may exist and affect display quality of the image of the display device.

Figure 1:
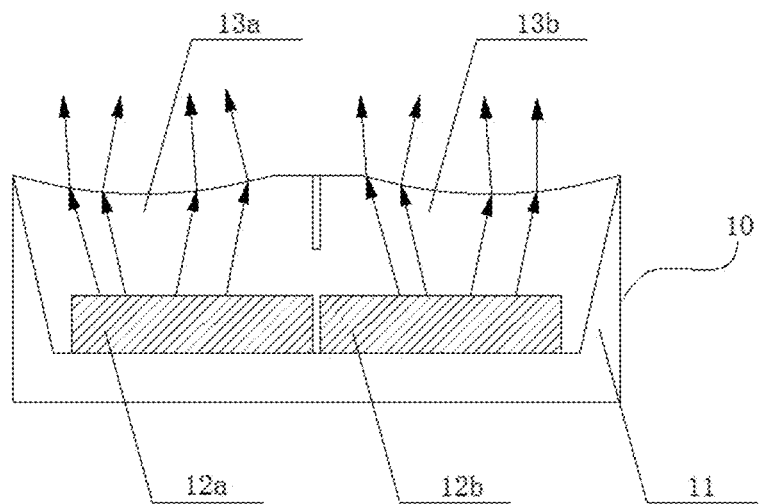
FIG. 1 is a schematic diagram of a structure of a lamp bead of a light bar according to an embodiment of the present disclosure.
Figure 2:
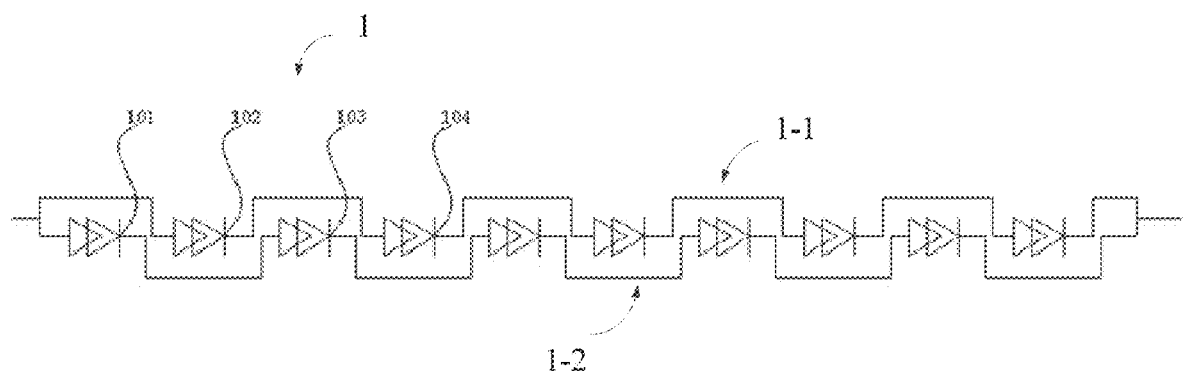
FIG. 2 is a layout view of a light bar according to an embodiment of the present disclosure.

As shown in FIGS. 1 to 2, the present disclosure provides a light bar 1 having a plurality of lamp beads, and each of the lamp beads is a dual-crystal lamp 10 having two light-emitting crystals.

The dual-crystal lamp 10 is a device having two light-emitting crystals that form a "symbiont", that is, the two light-emitting crystals are two light sources on one crystal substrate.

For example, the light-emitting crystal can be a light emitting diode (LED), therefore the dual-crystal lamp 10 has two LEDs. PN junctions of the two LEDs are connected in parallel, and the two LEDs are packaged together.

On the contrary, the single-crystal lamp is a device having only one light-emitting crystal (e.g., LED), which needs to be individually packaged.

Thus, a volume of one dual-crystal lamp 10 may be approximate to (or slightly larger than) one single-crystal lamp, and the number of dual-crystal lamps 10 arranged per the same area may be approximate to that of single-crystal lamps.

However, the actual number of light sources is doubled when the dual-crystal lamps 10 are used, thereby resulting in a small spacing and thus small dark region between adjacent light sources.

Therefore, if the light bar 1 (i.e., the dual-crystal lamp 10) in the present embodiment is used as a light source in a display device (e.g., a liquid crystal display device), the uneven brightness of the light-emitting region of the display device can be improved.

For a display device using the side-emitting backlight source, under the condition of uniform brightness, the light bar 1 (i.e., the dual-crystal lamp 10) in the present embodiment is arranged closer to the display region of the display panel, thereby resulting in a further narrowed boarder of the display device, and even a boarderless design.

Alternatively, for a display device using a direct-type backlight source, under the condition of uniform brightness, the light bar 1 (i.e., the dual-crystal lamp 10) in the present embodiment is arranged closer to the display panel, thereby reducing a thickness and volume of the display device.

Therefore, the light bar 1 of the above embodiment is a more preferable light source of the display device than the single-crystal lamp (i.e., a light bar having the single-crystal lamps).

In an embodiment, the dual-crystal lamp 10 further includes a housing 11. The housing 11 has a receiving space for receiving the light-emitting crystals, a first light outlet 13a for outputting light beam emitted from one of the two light-emitting crystals (e.g. a first light-emitting crystal 12a), and the second light outlet 13b for outputting light beam emitted from the other one of the two light-emitting crystals (e.g. a second light-emitting crystal 12b).

In the above implementation, the two light beams respectively emitted from the first light outlet 13a and the second light outlet 13b may intersect with each other to form an approximately U-shaped light beam, that is, the light beam emitted from each of the dual-crystal lamps 10 is a light beam approximate to a U shape. The light beam emitted by one single-crystal lamp typically is a light beam approximate to a V shape, the U-shaped light beams is more uniform than two V-shaped light beams.

Therefore, as compared with the light bar having the single-crystal lamps, the light bar 1 (i.e., the dual-crystal lamps 10) in the present embodiment may be further arranged closer to the display region or the display panel, thereby resulting in further narrowed boarder or further reduced thickness of the display device.

Figure 3:
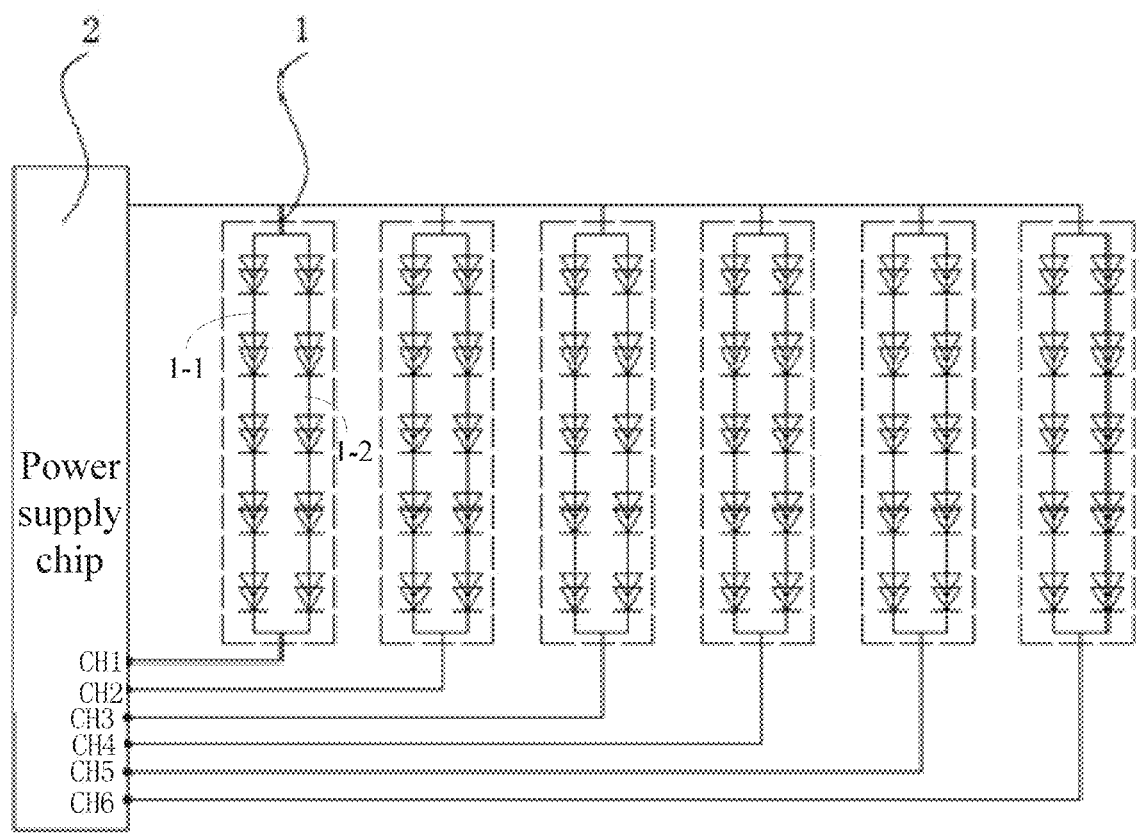
FIG. 3 is a schematic diagram of a circuit of a power supply chip and a light bar of a backlight module according to an embodiment of the present disclosure.

In an embodiment, as shown in FIG. 3, a plurality of the dual-crystal lamps 10 are sequentially arranged along a first direction (e.g., a length direction of the light bar) to form lamp strings 1-1 or 1-2, and the two light-emitting crystals in each of the dual-crystal lamps 10 are sequentially arranged along the first direction.

In the existing light bar (i.e. the light bar having a plurality of single-crystal lamps), the plurality of single-crystal lamps are arranged in sequence along the first direction (i.e., the length direction of the light bar). The two light-emitting 0.5 crystals of each of the dual-crystal lamps 10 in the embodiment are also arranged in sequence along the first direction (i.e., the arrangement direction of the dual-crystal lamps 10), which is equivalent to reducing the distance between two adjacent single-crystal lamps in the existing light bar as compared with the existing light bar.

Therefore, in a case where the light bar 1 (the dual-crystal lamp 10) in the present embodiment serves as a light source of the display device, the spacing between adjacent light sources of the display device is reduced, and the brightness of the light-emitting area of the display device is uniform.

Optionally, the plurality of dual-crystal lamps 10 form a plurality of lamp strings, and each of the lamp strings includes at least two dual-crystal lamps 10 electrically connected in series.

The light bar 1 includes a positive terminal and a negative terminal. The plurality of lamp strings are electrically connected in parallel between the positive terminal and the negative terminal.

The existing light bar of the display device has a plurality of single-crystal lamps connected in series, for example, the existing light bar has N (e.g., twelve) single-crystal lamps connected in series. A voltage output by a power supply circuit (e.g., the power supply chip 2) for supplying power to the light bar of the existing display device needs to match the voltage required by the existing light bar.

Therefore, when the dual-crystal lamp 10 serves as a light source of the display device, in a case where the number of the dual-crystal lamps 10 remains unchanged, N single-crystal lamps in each light bar 1 are replaced by N dual-crystal lamps 10. Since a nominal voltage of each dual-crystal lamp 10 is larger than a nominal voltage of the single-crystal lamp, the existing light bar power supply circuit cannot meet the voltage required by the N dual-crystal lamps 10 connected in series.

Since the plurality of lamp strings are connected in parallel, the voltage across each lamp string is equal to the power supply voltage output by the light bar supply circuit for one light bar (e.g., the light bar 1).

Therefore, if the light bar 1 of the above embodiment serves as the light source of the display device, the number of lamp strings in each light bar 1 and the number of the dual-crystal lamps 10 in each lamp string may be designed according to the power supply voltage of the existing light bar power supply circuit without changing a structure of the existing light bar power supply circuit (i.e., the power supply chip) of the display device.

The number of the dual-crystal lamps 10 in each light bar 1 may be determined according to the brightness requirement. The number of the dual-crystal lamps 10 connected in series in each lamp string may be determined according to the voltage output by the existing light bar power supply circuit. The number of lamp strings in each light bar 1 may be calculated according to the total number of the dual-crystal lamps 10 and the number of the dual-crystal lamps 10 connected in series in each lamp string.

For example, in the existing display device, each light bar has twelve single-crystal lamps connected in series, each single-crystal lamp has a nominal voltage of 3V, and a power supply voltage output by the power supply circuit for supplying power to each light bar is 36V. Since each of the dual-crystal lamps has a nominal voltage of 5.8V, twelve dual-crystal lamps 10 may form two lamp strings, and six dual-crystal lamps 10 are connected in series in each lamp string. In another embodiment, twelve dual-crystal lamps 10 may also form three lamp strings.

In an embodiment, as shown in FIG. 2, in one light bar 1, a plurality of the dual-crystal lamps 10 are arranged in sequence along the first direction, and any two adjacent dual-crystal lamps 10 belong to different lamp strings 1-1 or 1-2.

Due to the difference in the manufacturing process and the difference in the usage frequency, the brightnesses of the dual-crystal lamps 10 connected in series in different lamp strings may be different. Therefore, in order to make the brightness of the light emitted by one light bar 1 uniform as a whole, the dual-crystal lamps 10 belonging to different lamp strings may be arranged by turns or alternately along a straight line (e.g., the arrangement direction). The odd-numbered dual-crystal lamps 10 are connected in series to form a first lamp string 1-1, the even-numbered dual-crystal lamps 10 are connected in series to form a second lamp string 1-2, and the first lamp string 1-1 and the second lamp string 1-2 form a first light bar 1.

For example, as shown in FIG. 2, the light bar 1 includes a first dual-crystal lamp 101, a second dual-crystal lamp 102, a third dual-crystal lamp 103, and a fourth dual-crystal lamp 104 which are sequentially arranged. The first dual-crystal lamp 101 and the third dual-crystal lamp 103 are connected in series and belong to the first lamp string 1-1, and the second dual-crystal lamp 102 and the fourth dual-crystal lamp 104 are connected in series and belong to the second lamp string 1-2. Each lamp string has the same number of dual-crystal lamps 10.

In the above embodiment, each lamp string has the same number of dual-crystal lamps 10, therefore the voltages across the dual-crystal lamps 10 are the same, and in turn the currents flowing through the lamp strings are the same, thereby resulting in a good brightness uniformity of the dual-crystal lamps 10 in the plurality of lamp strings.

In an embodiment, the dual-crystal lamp 10 is a dual-crystal lamp light-emitting diode.

The light-emitting diode LED has the advantages such as low power consumption, low heat productivity, high brightness, long service life and the like, and the manufacture process thereof is easy to realize.

As shown in FIG. 3, the present disclosure further provides a backlight module including the light bar 1 in the above embodiment.

Specifically, the backlight module in the embodiment may be a side-emitting backlight module. For example, a plurality of light bars 1 are arranged on a light inlet side of the light guide plate of the side-emitting backlight module. Since the dual-crystal lamp serves as the light source of the light bar 1 in the embodiment, when the distances between the light bars 1 and the light guide plate (i.e., the display region) are the same, the light-emitting region of the display device has a uniform brightness. Under the condition that the light-emitting region of the display device has a uniform brightness, the light bar 1 may be arranged closer to the light guide plate (i.e., the display region), thereby further reducing the boarder of the display device, and even realizing the boarderless display device.

Alternatively, the backlight module in the embodiment may also be a direct-type backlight module. For example, a plurality of light bars 1 are sequentially arranged on a light inlet side of the diffusion plate of the direct-type backlight module. Since the dual-crystal lamp serves as the light source of the light bar 1 in the embodiment, when the distances between the light bars 1 and the diffusion plate (i.e., the display panel) are the same, the light-emitting region of the display device has a uniform brightness. Under the condition that the light-emitting region of the display device has a uniform brightness, the light bar 1 may be arranged closer to the diffusion plate (i.e., the display panel), thereby further reducing the thickness and volume of the display device.

Certainly, the backlight module may also be a backlight module having other light guiding structures.

In an embodiment, the backlight module further includes a power supply chip 2. The power supply chip 2 has a plurality of power supply channels CH1, CH2, CH3, CH4, CH5, and CH6, and each light bar 1 is electrically connected to one of the power supply channels.

In the case where each power supply channel of the power supply chip 2 (LED driver) outputs a certain voltage, the higher the output current is (within a predetermined range), the higher the operating efficiency (power conversion rate) of the power supply chip 2 is.

In principle, the brightness of the dual-crystal lamp increases with the current flowing through the dual-crystal lamp. In the case where the dual-crystal lamps reach the same brightness, that is, in the case where the same current flows through each dual-crystal lamp, the current flowing through each lamp string is equal to the current flowing through a single dual-crystal lamp when the lamp strings are connected in parallel, and the total current of currents output by the power supply channels is equal to the sum of the currents flowing in the lamp strings, therefore the total current is larger than the total current when the dual-crystal lamps are connected in series (that is, the current flowing through a single dual-crystal lamp). Therefore, the currents output by the power supply channels of the power supply chip 2 are increased, the working efficiency of the power supply chip 2 is improved, and the backlight power consumption of the backlight module is reduced.

Of course, the number of the lamp strings in the light bar is related to the output currents of the power supply channels of the power supply chip 2 in the state of highest working efficiency. That is, when the light bar has a predetermined brightness (e.g., 150 nit), a sum of the operating currents of the lamp strings in each light bar may maximize the operating efficiency of the power supply chip 2.

Of course, each power supply channel supplies power independently, therefore if one of the power supply channels goes wrong, the remaining power supply channels cannot be influenced.

In an embodiment, in order to make the power supply currents output by the power supply channels the same for facilitating power supply control, each light bar has the same number of lamp strings.

In order to ensure the light source of the backlight module has the uniform brightness, in an embodiment, each light bar 1 has the same number of the dual-crystal lamps.

Specifically, the number of power supply channels of the power supply chip 2 in above embodiment and the power supply voltages for the power supply channels may remain unchanged. For example, the power supply chip 2 has six power supply channels CH1, CH2, CH3, CH4, CH5 and CH6, and each power supply channel outputs the same power supply voltage. Since the power supply voltage for each power supply channel is too small to meet the power supply voltage required by the plurality of the dual-crystal lamps connected in series in the light bar 1, the plurality of the dual-crystal lamps in each light bar 1 may form two lamp strings, and the same number of dual-crystal lamps are connected in series in each of the lamp strings. In another embodiment, the plurality of dual-crystal lamps in each light bar 1 may form three lamp strings, and the same number of dual-crystal lamps are connected in series in each of the lamp strings. Therefore, each power supply channel outputs the same power supply voltage, and the same current flows through the dual-crystal lamps in the lamp strings, thereby ensuring the uniform brightness of the plurality of dual-crystal lamps in each light bar 1, and in turn the uniform brightness of the whole light source of the backlight module.

An embodiment provides a display device including the backlight module in above embodiment.

The above backlight module and the display panel are aligned and assembled to form a cell, so as to obtain a display device (e.g., a liquid crystal display device).

Since the dual-crystal lamp serves as a light source of the display device in the present embodiment, the light-emitting region of the display device in the present embodiment has a more uniform brightness, and the display device has a narrower border or a smaller thickness, as compared with a display device in which the single-crystal lamp serves as the light source.

It is to be understood that the above embodiments are merely exemplary embodiments for explaining the principles in the present disclosure, and the present disclosure is not limited thereto. It will be apparent to one of ordinary skill in the art that various changes and modifications may be made therein without departing from the spirit and essence of the present disclosure, and these changes and modifications also fall within the scope of the present disclosure.

What is claimed is:

1. A light bar comprising a plurality of dual-crystal lamps, wherein each of the plurality of dual-crystal lamps has two light-emitting crystals,
    the plurality of dual-crystal lamps are divided into two lamp strings connected in parallel,
    each of the two lamp strings comprises at least two dual-crystal lamps of the plurality of dual-crystal lamps arranged along a first direction and electrically connected in series, and
    the two light-emitting crystals in each of the two dual-crystal lamps are sequentially arranged along the first direction,
    the plurality of dual-crystal lamps belonging to the two lamp strings are arranged alternately along a single straight line,
    a conductive wire for connecting dual-crystal lamps in a first lamp string of the two lamp strings is on a first side of the single straight line, and a conductive wire for connecting dual-crystal lamps in a second lamp string of the two lamp strings is on a second side of the single straight line opposite to the first side.

2. The light bar according to claim 1, wherein
    the dual-crystal lamp further comprises a housing,
    the housing has a receiving space for receiving the light-emitting crystals, a first light outlet, and a second light outlet,
    a light beam emitted from a first light-emitting crystal of the two light-emitting crystals is output through the first light outlet, and
    a light beam emitted from a second light-emitting crystal of the two light-emitting crystals is output through the second light outlet.

3. The light bar according to claim 1, wherein each of the lamp strings has the same number of dual-crystal lamps.

4. The light bar according to claim 3, further comprising a positive terminal and a negative terminal, wherein
    the plurality of lamp strings are connected in parallel between the positive terminal and the negative terminal.

5. A backlight module comprising a plurality of light bars connected in parallel, each of which is the light bar according to claim 4.

6. The backlight module according to claim 5, wherein each of the light bars comprises the same number of lamp strings.

7. The backlight module according to claim 6, further comprising a power supply chip having a plurality of power supply channels electrically connected to the plurality of light bars in a one-to-one correspondence.

8. A display device comprising a backlight module, which is the backlight module according to claim 5.

9. The light bar according to claim 1, wherein
    the dual-crystal lamp has two dual-crystal light-emitting diode,
    PN junctions of the two dual-crystal light-emitting diodes are connected in parallel, and
    the two dual-crystal light-emitting diode are packaged together.

* * * * *